US011736926B2

(12) United States Patent
Odini et al.

(10) Patent No.: US 11,736,926 B2
(45) Date of Patent: Aug. 22, 2023

(54) HANDLING AN EVENT MESSAGE IN A COMMUNICATIONS SYSTEM

(71) Applicant: HEWLETT PACKARD ENTERPRISE DEVELOPMENT LP, Houston, TX (US)

(72) Inventors: Marie-Paule Odini, Grenoble (FR); Biswadeb Dutta, Chestnut Hill, MA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 361 days.

(21) Appl. No.: 17/143,066

(22) Filed: Jan. 6, 2021

(65) Prior Publication Data

US 2022/0095089 A1 Mar. 24, 2022

(30) Foreign Application Priority Data

Sep. 21, 2020 (EP) .................................... 20306067

(51) Int. Cl.
*H04W 8/00* (2009.01)
*G06N 5/04* (2023.01)
*G06N 20/00* (2019.01)

(52) U.S. Cl.
CPC ................ *H04W 8/00* (2013.01); *G06N 5/04* (2013.01); *G06N 20/00* (2019.01)

(58) Field of Classification Search
CPC ........... H04W 8/00; G06N 5/04; G06N 20/00; G06F 9/542

(Continued)

(56) References Cited

U.S. PATENT DOCUMENTS 8,046,772 B2 * 10/2011 Upton ..................... G06F 9/542 719/311
2008/0162565 A1 * 7/2008 Waguet .................. G06Q 10/06 715/764

(Continued)

OTHER PUBLICATIONS

Arrieta, A.B. et al., "Explainable Artificial Intelligence (XAI): Concepts, Taxonomies, Opportunities and Challenges Toward Responsible AI," Neural Network—Artificial Intelligence, Dec. 30, 2019, https://arxiv.org/pdf/1910.10045.pdf.

(Continued)

*Primary Examiner* — Hirdepal Singh
(74) *Attorney, Agent, or Firm* — Haseltine Lake Kempner LLP

(57) ABSTRACT

The present disclosure relates to a method for handling an event message in a communications system. The method comprises receiving the event message and processing the event message using a pre-processing module of the communications system to determine if the event message is relevant for a management module of the communications system. Responsive to determining that the event message is relevant, the event message is tagged to generate a tagged event message, and the tagged event message is transmitted to the management module. Tagging the event comprises adding, to the event message, a model or pipeline label identifying a model or pipeline applied to the event message by the pre-processing module, a status identifier indicating a status of the event message following a process or set of processes performed by the model or pipeline, and an input identifier for identifying features or variables of the event message that were used as inputs to the model or pipeline.

20 Claims, 10 Drawing Sheets

(58) Field of Classification Search
USPC ........................................................ 455/422.1
See application file for complete search history.

(56) References Cited

U.S. PATENT DOCUMENTS

| | | | | |
|---|---|---|---|---|
| 2015/0154501 | A1* | 6/2015 | Boddhu | G06N 20/00 706/52 |
| 2016/0330219 | A1* | 11/2016 | Hasan | H04L 63/1408 |
| 2018/0063265 | A1 | 3/2018 | Crossley et al. | |
| 2018/0285798 | A1* | 10/2018 | Kearns | G06Q 10/0637 |
| 2019/0370697 | A1 | 12/2019 | Iyer | |
| 2020/0012543 | A1* | 1/2020 | Masuda | G06F 11/0793 |
| 2020/0327000 | A1* | 10/2020 | Hirawady | G06Q 10/105 |
| 2021/0326335 | A1* | 10/2021 | Michaelis | H04L 67/12 |

OTHER PUBLICATIONS

International Telecommunication Union, "Unified Architecture for Machine Learning in 5G and Future Networks," International Telecommunication Union ITU-T Technical Specification, Jan. 2019. https://www.itu.int/en/ITU-T/focusgroups/ml5g/Documents/ML5G-delievrables.pdf.

Navigli, R. et al., "A Graph-based Algorithm for Inducing Lexical Taxonomies from Scratch," IJCAI 2011, Proceedings of the 22nd International Joint Conference on Artificial Intelligence, Jan. 2011, https://www.researchgate.net/publication/220812388_A_Graph-Based_Algorithm_for_Inducing_Lexical_Taxonomies_from_Scratch.

Wang, J. et al., "ALSR: An Adaptive Label Screening and Relearning Approach for Interval-oriented Anomaly Detection," Expert Systems with Applications, Dec. 1, 2019, vol. 136, pp. 94-104, https://www.sciencedirect.com/science/article/abs/pii/S0957417419304282.

Bryan Sullivan, "VES Home", available online at <https://wiki.opnfv.org/display/ves/VES+Home>, May 4, 2020, 4 pages.

Data Communications Networks, "Information Technology—Open Systems Interconnection—Systems Management: Alarm Reporting Function", CCITT Recommendation X.733, 1992, 24 pages.

Fedor et al., "A Simple Network Management Protocol (SNMP)", Network Working Group, RFC1157, May 1990, 36 pages.

Gartner, "AIOps (Artificial Intelligence for IT Operations)", available online at <https://www.gartner.com/en/information-technology/glossary/aiops-artificial-intelligence-operations>, 2021, 3 pages.

Gerhards et al., "The Syslog Protocol", Network Working Group, Request for Comments: 5424, Mar. 2009, 38 pages.

Kschischang et al., "Factor Graphs and the Sum-Product Algorithm", IEEE Transactions on Information Theory, vol. 47, No. 2, Feb. 2001, 76 pages.

Ronan et al., "Robustness and Explainability of Artificial Intelligence", JRC Technical Report, 2020, 40 pages.

Turek, Matt, "Explainable Artificial Intelligence (XAI)", DARPA, available online at <https://web.archive.org/web/20200819155956/https://www.darpa.mil/program/explainable-artificial-intelligence>, Aug. 19, 2020, 4 pages.

* cited by examiner

HANDLING AN EVENT MESSAGE IN A COMMUNICATIONS SYSTEM

BACKGROUND

Modern communications systems such as 5G networks typically divide a large service area into multiple smaller areas known as cells. Each cell is served by one or more access nodes which includes an antenna for wirelessly communicating with user devices such as mobile phones. Each access node is coupled to a core network of the communications system, so as to permit access by the user devices to the core network and to services that are provided by or accessed via the core network. In such communications systems, there are typically many physical network resources, network applications and network services that may generate event messages which provide management information relating to their configuration, operation and the like. These event messages (sometimes referred to simply as "events") are typically transmitted to or otherwise obtained by a management module of the communications system, which manages the physical network resources, network applications and network services and provides a user interface that presents management information to an operator of the system based on the event messages, to assist the operator in identifying and rectifying faults, monitoring system performance, detecting malicious activity such as malware attacks, etc. The management module may be further configured to act autonomously to respond to certain event messages without requiring intervention by a human operator.

BRIEF DESCRIPTION OF THE DRAWINGS

Embodiments of the invention will now be described, strictly by way of example, with reference to the accompanying Figures, of which.

DETAILED DESCRIPTION

Figure 1:
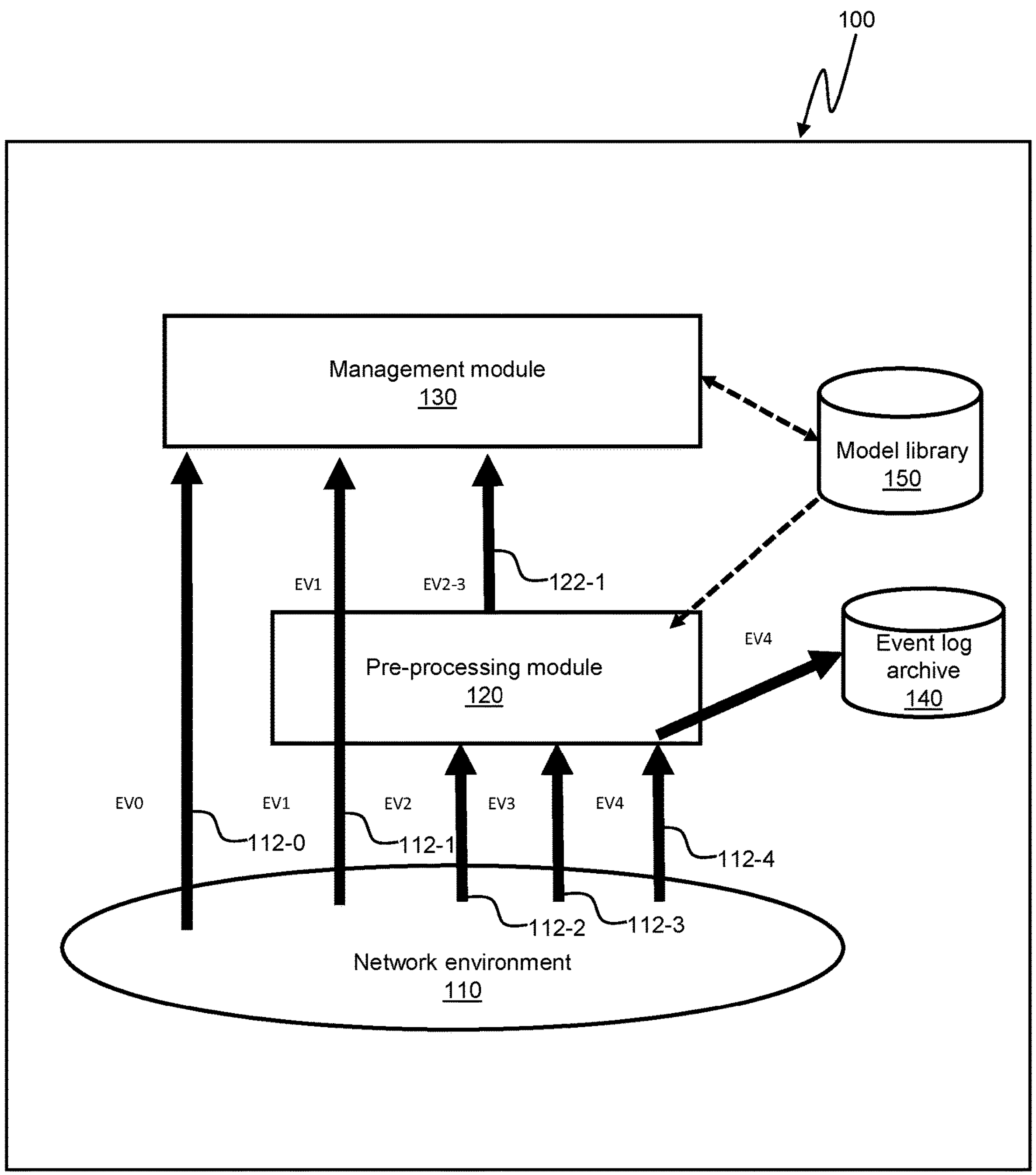
FIG. 1 is a schematic representation of an example communications management system.

In complex systems such as 5G networks with multiple network resources, applications and services, the volume of event messages generated by the constituent parts of the system (e.g. physical network resources, network applications and network services) is typically high, so some pre-processing of event messages may be employed by the system, often using machine learning (ML) and/or artificial intelligence (AI) models, to filter, enrich or group related event messages, before they are received by the management module, in order to enable the management module to provide richer and more meaningful information to the operator. The present disclosure provides various solutions for enriching event messages with additional information that is relevant for tracing processing steps that have been applied to the event messages prior to being received by a management module, and thus how the event messages that are received by the management module were generated. This additional information facilitates identification of faults and security breaches, prediction of outages and identification of new events that may have been introduced through a software revision, and also provides a level of transparency about models (e.g. AI and ML models) that have been applied to the event messages. Enriching the event messages with additional information may enable an increased degree of autonomy and thus more efficient management of the network, as the management module may be able to determine, based on the enriched event messages, whether a situation or condition indicated by the content of an event message can be resolved without intervention from an operator of the network, or whether the situation or condition should be flagged to the network operator to act upon. Thus, the management module may be able to resolve some situations (e.g. low-risk or low priority fault situations) autonomously, and may be able to flag other situations (e.g. higher-risk or higher-priority fault situations such as serious faults or network threats such as potential malware attacks) to the network operator as high-priority situations that need to be resolved. Thus, network efficiency can be increased, through autonomous resolution by the management module of certain situations, and network downtime (and/or the risk of network downtime) can be reduced, through enhanced notification to the network operator, by the management module, of situations such as serious network faults or network threats.

One example of the present disclosure is directed to a method for handling an event message in a communications system. The method comprises receiving the event message and processing the event message using a pre-processing module of the communications system to determine if the event message is relevant for a management module of the communications system. Responsive to determining that the event message is relevant, the event message is tagged to generate a tagged event message. The tagged event message is transmitted to the management module. Tagging the event comprises adding, to the event message, a model or pipeline label identifying a model or pipeline applied to the event message by the pre-processing module, a status identifier indicating a status of the event message following a process or set of processes performed by the model or pipeline, and an input identifier for identifying features or variables of the event message that were used as inputs to the model or pipeline.

A further example of the present disclosure is directed to a computer readable medium storing instructions which, when executed by a processing resource, cause the processing resource to: pre-process an event message generated in a communications system to determine if the event message is relevant for a management module of the communications system. Responsive to determining that the event message is relevant the instructions are to cause the processing resource to: tag the event message with a model or pipeline label identifying a model or pipeline applied to the event message during pre-processing of the event message, a status identifier indicating a status of the event message following a process or set of processes performed by the model or pipeline, and an input identifier for identifying features or variables of the event message that were used as inputs to the model or pipeline. Responsive to determining that the event message is not relevant, the instructions are to cause the processing resource to tag the event message with a model or pipeline label identifying a model or pipeline applied to the event message during pre-processing of the event message, a status identifier indicating that the event message is archived following an archiving process performed by the model or pipeline, and an input identifier for identifying features or variables of the event message that were used as inputs to the model or pipeline, and to transmit the tagged event message to an event log archive.

A further example of the present disclosure is directed to a network device comprising one or more processing resources and memory storing instructions which, when executed by the one or more processing resources, cause the network device to process an event message generated in a communications system using a machine learning or artificial intelligence model or pipeline to determine if the event is relevant. Responsive to determining that the event message is relevant, the instructions are to cause the network device to tag the event message with a model or pipeline label identifying the machine learning or artificial intelligence model or pipeline, a status identifier indicating a status of the event message following a process or set of processes performed by the machine learning or artificial intelligence model or pipeline, and an input identifier for identifying features or variables of the event message that were used as inputs to the machine learning or artificial intelligence model or pipeline, and to transmit the tagged event message to a management module of the communications system.

As discussed above, modern communications systems typically include many network elements such as physical network resources, network applications and network services, which generate event messages that are transmitted to (or otherwise received by) a management module of the communications system. An event message (sometimes also referred to as an event) is a collection of data arranged in a predetermined format (typically according to a defined protocol) which provides management information about a network node or element such as a physical network resource, a network application or a network service that is managed by the management module to the management module. The information may include, for example, information about the status (e.g. online/offline) or configuration of the network node or element, information about faults, alarms or errors in or detected by the network node or element, information about physical and/or environmental conditions such as temperature, humidity etc. detected by the network node or element, and other management information that may be relevant to the operation of the network node or element or the network as a whole. The management module is a module (which may be a dedicated hardware module or a software module executing on appropriate hardware) which is configured to monitor and control the network nodes or elements that it manages, in order to keep the network functioning correctly.

As will be appreciated, in a complex network that includes multiple network nodes or elements, multiple events or event messages may be active at any one time, which makes the task of the management module and its operator to keep the network functioning correctly complicated. Pre-processing of at least some of the event messages may be employed in order to reduce the volume of event messages received by the management module, to enable the management module to present a richer and more relevant set of management information to the operator. This pre-processing often involves the use of machine learning (ML) and/or artificial intelligence (AI) models, and possibly other approaches such as algorithmic models, to filter or refine the event messages before they are received by the management module.

By tracing the origins and/or processing steps of an event message, one may determine how the event messages output by the pre-processing module to the management module were generated. For example, in cyber security applications, anomalous behaviour may be an indicator of security breaches. New events that have been created can be identified as malware, and predictive maintenance of the system can be performed to prevent any attack. As another example, frequently occurring sequences of events may indicate the signature of a pattern that can be used to infer, or even predict, outage scenarios that are candidates for triage, in order to determine a priority order for modifications and/or upgrades to the network to mitigate the risk of such outage scenarios. Additionally, new "unknown" events that might have been introduced through a software revision can be identified. Furthermore, regulatory bodies increasingly require a high level of transparency about AI and ML models that have been applied to data.

Referring first to FIG. 1, a communications system is shown generally at 100. The communications system 100 includes a network environment 110 containing network elements such as, for example, network resources, applications and services. The communications system 100 further includes a pre-processing module 120, a management module 130, an event log archive 140 and a model library 150.

The network elements of the network environment 110 generate event messages 112-0-112-4, which provide management information on the status and operation of the communications system 100. The event messages 112-0-112-4 may provide information, for example, on the operational state of the network elements of the network environment 110, faults detected in or by the network elements, environmental conditions in the vicinity of the network conditions (e.g. temperature, humidity and the like), physical information such as sensor outputs, and the like. In the illustrated example the event messages 112-1-112-4 are received by the pre-processing module 120 for pre-processing before reaching the management module 130, while the event message 112-0 may be received directly by the management module 130, as a "raw" event. The event messages 112-0-112-4 may be transmitted by the network elements of the network environment 110, or alternatively the pre-processing module 120 and/or the management module 130 may retrieve, access or query the event messages from the network elements of the network environment 110 to receive the event messages.

The pre-processing module 120 is configured to pre-process event messages 112-1-112-4 received from the network environment 110 using a model such as an AI or ML model, or a model of another type such as an algorithmic model, or a pipeline comprising a sequence of such models, in order to filter or refine the received event messages. The pre-processing module 120 may be provided as a standalone physical network device or entity or micro-service, or may be incorporated into the management module 130 itself. The pre-processing module 120 may be implemented in software (e.g. as a set of computer program instructions stored in a memory which, when executed by a suitable processing resource, cause the processing resource to execute the instructions), or may be implemented in hardware, e.g. a suitably configured application specific integrated circuit (ASIC), field-programmable gate array (FPGA), memristor based Ternary Content Addressable Memory (TCAM), or the like, or alternatively may be implemented using a combination of hardware and software.

The management module 130 is configured to receive event messages from the network resources, applications and services of the network environment 110 and from the pre-processing module 120 and to present management information to an operator of the system 100, e.g. via a user interface.

The event log archive 140 is configured to receive and store event messages that have been archived following pre-processing by the pre-processing module 120.

The model library 150 contains models (e.g. artificial intelligence (AI) models, machine learning (ML) models, and/or algorithmic models or the like) that can be applied to incoming events or event messages by the pre-processing module 120. A model label that provides an indication of the category or type of the model is associated with each model in the model library 150. Table 1 below shows examples of model labels that may be associated with models in the model library 150.

TABLE 1

| |
|---|
| 1. Linear and Non-linear regression |
| 2. Logistic regression |
| 3. Linear discriminant analysis |
| 4. Decision tree |
| 5. Naïve Bayes |
| 6. K-Nearest Neighbors |
| 7. Learning vector quantization |
| 8. Support Vector machines |
| 9. Bagging and random forest |
| 10. Deep neural networks |
| 11. Convolutional Neural Networks |
| 12. Recurrent Neural Networks |
| 13. Long Short Term Memory Networks |
| 14. Stacked Auto-Encoders |
| 15. Deep Boltzmann Machine |
| 16. Deep Belief Networks |
| 17. Locality Sensitive Hashing |
| 18. K-Means Clustering |
| 19. Mean-Shift Clustering |
| 20. Density-Based Spatial Clustering |
| 21. Expectation-Maximization Clustering |
| 22. Agglomerative Hierarchical Clustering |
| 23. Frequent Pattern Mining and Association Rule Learning |
| 24. Self-Organized Maps |
| 25. Word-to-Vector, Sentence-to-Vector, Document-to-Vector |
| 26. T-Distributed Stochastic Neighbor Embedding |
| 27. Perceptron and Multi-Layer Perceptron |
| 28. Back-Propagation |
| 29. Stochastic Gradient Descent |
| 30. Hopfield Network |
| 31. Radial Basis Function Network |
| 32. Probabilistic Graphical Networks and Bayesian Networks |

The model library 150 may also include predefined model pipelines, each comprising a sequence of models. The predefined model pipelines may be defined by or associated with factor graphs or dynamic acyclic graphs (DAGs), which describe the sequence of models in the pipeline. The factor graphs or DAGs may be stored in a database separate to the model library 150, and may each be associated with a signature or "bar code", which identifies the factor graph or DAG. Each predefined model pipeline may be associated with a corresponding pipeline label, which comprises the model labels associated with the constituent models of the pipeline, in the model library 150.

The model library 150 can be accessed for reading models, model labels, pipelines and pipeline labels by both the pre-processing module 120 and the management module 130. Additionally, and in some examples, an operator of the system 100 can access the model library to create, update and delete models, model labels, pipelines and pipeline labels, e.g. through a REST application programming interface (API), which may be accessed, for example, using the user interface of the management module 130.

In operation of the system 100, event messages 112-1-112-4 that are received at the pre-processing module 120 are processed by the pre-processing module 120 by applying a model or pipeline from the model library 150 to the received event message. The model or pipeline applied to the received event message may comprise, for example, an artificial intelligence (AI) model, and/or a machine learning (ML) model, and/or an algorithmic model or the like, or a sequence of such models. Processing the received event message may comprise applying the model or pipeline to assess the relevance of a received event message to the management module 130 and, responsive to a determination that the event message is relevant, transmitting the event message (e.g. event message 112-1 in FIG. 1) to the management module 130, or, responsive to a determination that the event message is not relevant, archiving the event message in the event log archive 140 without transmitting it to the management module 130. Alternatively or additionally, processing the received event message may comprise combining the content of two or more of the received event messages (e.g. event messages 112-2, 112-3) into a single event message 122-1 that is transmitted to the management module 130.

The processed event message is tagged by the pre-processing module 120 with a model or pipeline label identifying the model or pipeline (i.e. sequence of models) that has been applied to the event message, a status identifier identifying a status of the event message following the process or set of processes performed by the model or pipeline, and an input identifier for identifying input features or variables of the event message that were used as input to the model or pipeline. The input identifier may comprise the input features or variables themselves, or may alternatively comprise a pointer which points to a record in a separate feature table (e.g. a feature table stored in the pre-processing module 120 or in the network element that transmitted the event) containing variables or features of the event message. As the input features or variables may contain a significant amount of information, using a pointer to a separate feature table as the input identifier reduces the size of the tagged event message, as compared to using the input features or variables themselves as the input identifier.

Thus, the pre-processing module 120 enriches the event message with additional information that is useful for determining which process(es) were performed and which model (s) and input features or variables were used by the pre-processing module 120 to process the tagged event label that is output by the pre-processing module 120 to the management module 130.

For example, if the event message has been processed by a single model x and forwarded to the management module 130, the pre-processing module 120 may tag it with a model label "Mx" (where x is the label of the model that was applied), a status identifier "Screened", indicating that the event message has been screened by the pre-processing module 120, and an input identifier pointing to a location in a feature table that holds the features or variables of the input event message that were used as inputs to the model, before forwarding the tagged event message on to the management module 130. If the event message has been processed by a sequence of three models x, y, z in a pipeline and forwarded on to the management module 130, the pre-processing module 120 may tag it with a pipeline label "Px,y,z" (where x, y and z are the labels of the models that were applied by the pipeline P, in the order in which they were applied to the event message), a status identifier "Screened", and one or more input identifiers pointing to locations in a feature table at which the features or variables of the input event message that were used as inputs to the applied models, before forwarding the tagged event message on to the management module 130. If the content of two or more incoming event messages has been combined by a single model x to generate an outgoing event message that is forwarded on to the management module 130, the pre-processing module 120 may tag it with a model label "Mx" (where x is the label of the model that was applied), a status identifier "Generated", indicating that the event message has been generated by the pre-processing module 120, and input identifiers pointing to locations in a feature table at which the features or variables of the input event messages that were used as inputs to the applied model, before forwarding the tagged event message on to the management module 130. If the event message has been processed by a single model x and determined not to be relevant to the management module 130, the pre-processing module 120 may tag it with a model label "Mx" (where x is the label of the model that was applied), a status identifier "Archived", indicating that the event message has been archived, and an input identifier pointing to a location in a feature table at which the features or variables of the input event message that were used as inputs to the applied model, before forwarding the tagged event message on to the event log archive 140.

The pre-processing module 120 may also tag the event message with information on output variables for the one or more models that were applied to the event message prior to forwarding the tagged event message to the management module 130 or to the event log archive 140 as appropriate, and/or a factor graph or DAG signature or "bar code" indicative of a factor graph or DAG representation of the model(s) applied, thus further enriching the event label with further additional information that is useful for determining the effects of the model(s) applied by the pre-processing module 120.

To tag an event message with a model label, the pre-processing module 120 retrieves, from the model library 150, the model or pipeline label corresponding to the model or pipeline that has been applied and adds the retrieved model or pipeline label to the event message. Where a pipeline comprising a sequence of models has been applied, a model label corresponding to each model in the sequence is retrieved from the model library 150, and the retrieved model labels are added to the event message in the order in which the models were applied to the event message to create a pipeline label. Alternatively a pipeline label associated with the pipeline may be retrieved from the model library 150 and added to the event message.

Figure 2A:
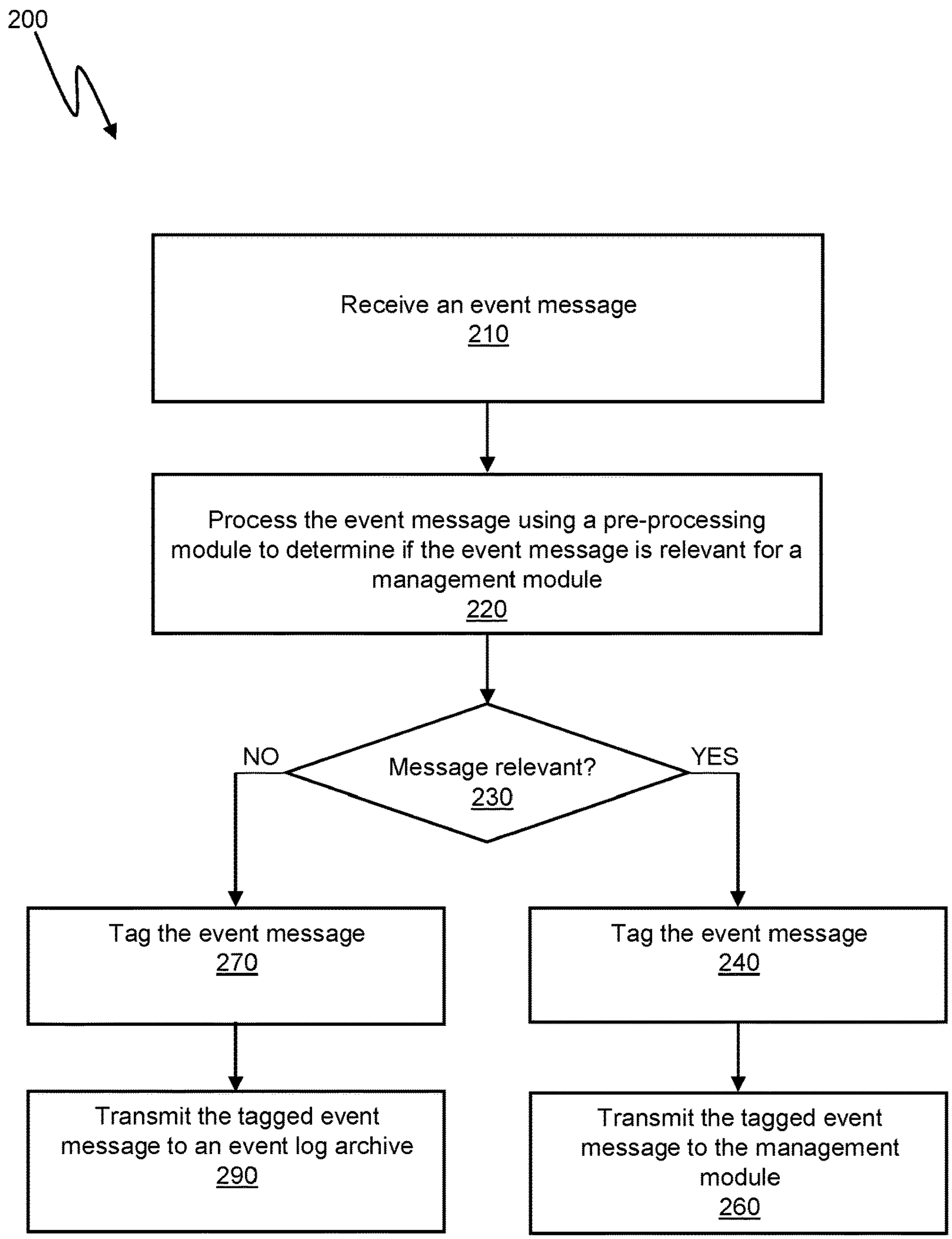
FIG. 2*a* is a flow chart illustrating an example method for handling an event message in the communications management system of FIG. 1.

FIG. 2*a* is a flow chart illustrating a method, performed by the pre-processing module 120 in the system of FIG. 1, for handling a received event message.

The method, shown generally at 200 in FIG. 2, commences at step 210, in which an event message (e.g. event message 112-1, 112-2, 112-3, 112-4) is received by the pre-processing module 120.

At step 220 the pre-processing module 120 processes the received event message using a model or a pipeline comprising a sequence of models to determine (step 230) if the received event message is relevant to the management module 130. The relevance (or otherwise) of the received event message may be determined based on a number of factors, such as a status of the communications system 100, a "signature" of information contained in the event message, and/or attributes of the information contained in the event message. If initial processing of the event message by the pre-processing module 120 does not yield an unambiguous determination of the relevance of the received event message, the event message may be processed again by the pre-processing module 120 using the same or a different model or pipeline of models, until an unambiguous determination of its relevance is made.

If the event message is determined to be relevant to the management module 130, the method passes to step 240, at which the event message is tagged, as will be described below with reference to FIG. 2*b*.

The method then passes to step 260, in which the tagged event message is transmitted to the management module 130.

If the event message is determined not to be relevant to the management module 130, the method passes to step 270, at which the event message is tagged, as will be described below with reference to FIG. 2*c*.

The method then passes to step 290, in which the tagged event message is transmitted to the event log archive 140.

Figure 2B:
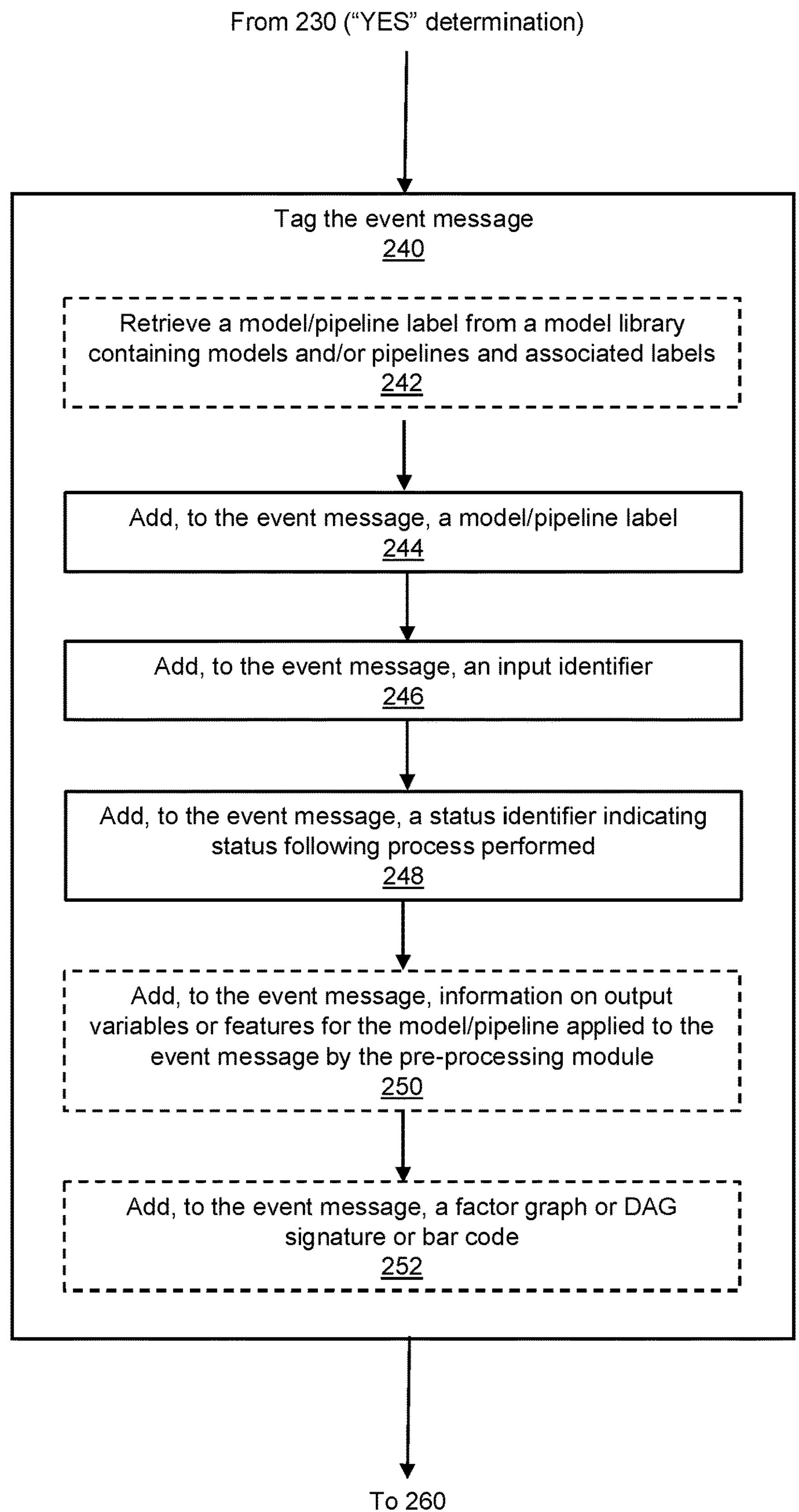
FIG. 2*b* is a flow chart illustrating an example method for tagging an event message that is determined to be relevant to the communications management system.

FIG. 2*b* is a flow chart illustrating a method, performed by the pre-processing module 120 in the system of FIG. 1, for tagging a received event message that has been determined to be relevant to the management module 130.

In a first step 242, a model or pipeline label which identifies the model or pipeline of models, as appropriate, applied to the event message by the pre-processing module 120, may be retrieved from the model library 150 by the pre-processing module 120.

The model or pipeline label retrieved from the model library 150 (or a model or pipeline label otherwise obtained, e.g. from local storage of the pre-processing module 120) is then added to the event message, at step 244.

An input identifier for identifying features or variables of the event message that were used as inputs to the model or pipeline is added to the event message at step 246. The input identifier may comprise a pointer to a record in a separate feature table, as discussed above.

A status identifier (e.g. "Screened", "Generated", as described above) indicating the status of the event message following the process(es) applied to the event message is added to the event message, at step 248.

In some examples, information on output variables for the model or pipeline applied by the pre-processing module 120 to the received event message may be added to the event message, at step 250.

In some examples, a factor graph or DAG signature or "bar code" associated with the process or set of processes performed by a pipeline on the event message may be added to the event message, at step 252.

It should be noted that steps 244-252 (where performed) may be performed in any order to tag the event message with (e.g. add to the event message) the relevant labels, identifiers and other information.

Following completion of steps 242-252 (where performed), the method passes back to step 260 of method 200, at which the tagged event message is transmitted to the management module 130.

Figure 2C:
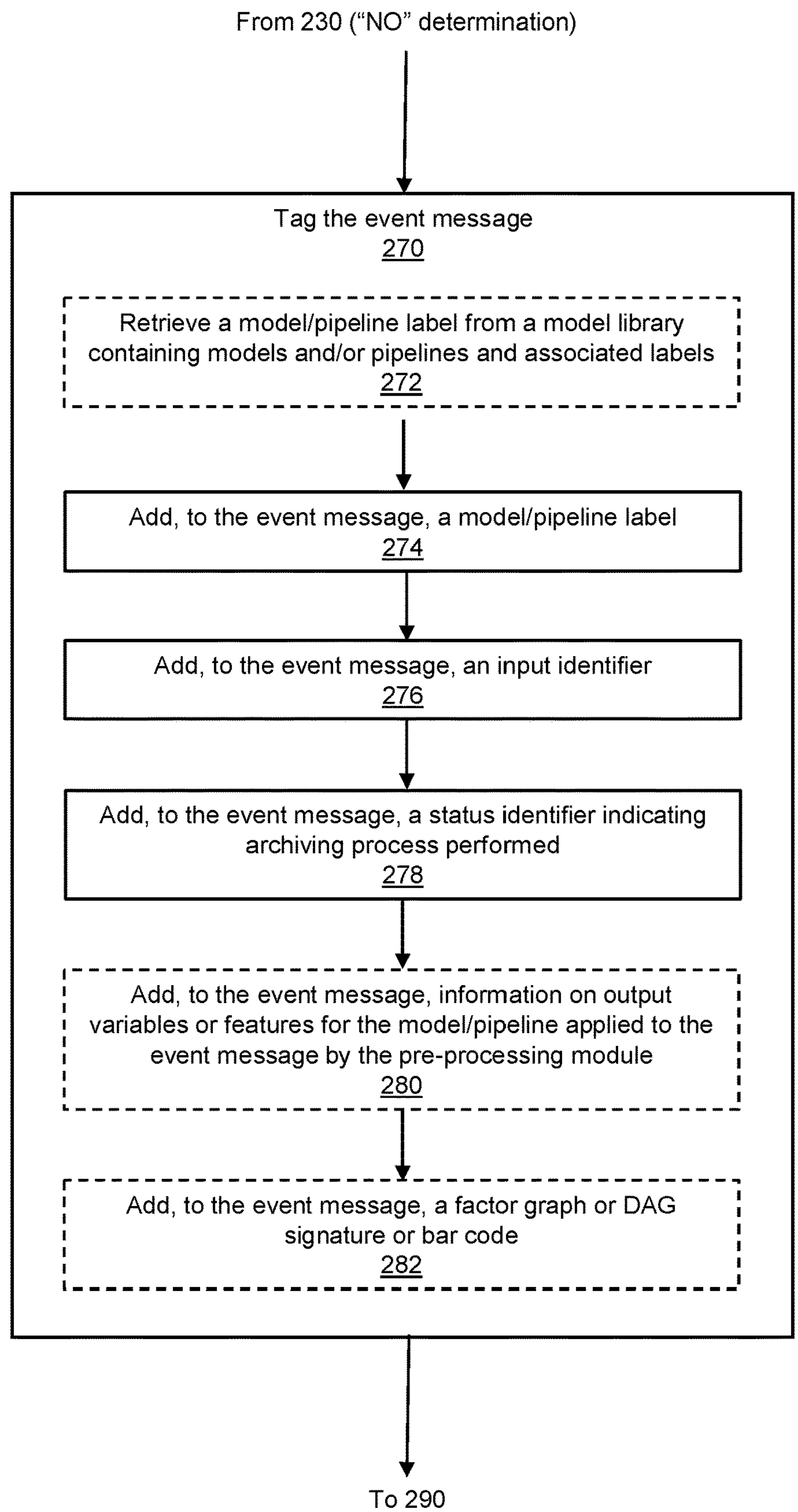
FIG. 2*c* is a flow chart illustrating an example method for tagging an event message that is determined not to be relevant to the communications management system.

FIG. 2*c* is a flow chart illustrating a method, performed by the pre-processing module 120 in the system of FIG. 1, for tagging a received event message that has been determined not to be relevant to the management module 130.

In a first step 272, a model or pipeline label which identifies the model or pipeline of models, as appropriate, applied to the event message by the pre-processing module 120, may be retrieved from the model library 150 by the pre-processing module 120.

The model or pipeline label retrieved from the model library 150 (or a model or pipeline label otherwise obtained, e.g. from local storage of the pre-processing module 120) is then added to the event message, at step 274.

An input identifier for identifying features or variables of the event message that were used as inputs to the model or pipeline is added to the event message at step 276. The input identifier may comprise a pointer to a record in a separate feature table, as discussed above.

A status identifier indicative that the event message has been archived (e.g. a status indicator "Archived", as described above) as a result of an archiving process applied to the event message following the determination that it is not relevant to the management module 130 is added to the event message, at step 278.

In some examples, information on output variables for the model or pipeline applied by the pre-processing module 120 to the received event message may be added to the event message, at step 280.

In some examples, a factor graph or DAG signature or "bar code" associated with the process or set of processes performed by a pipeline on the event message may be added to the event message, at step 282.

It should be noted that steps 274-282 (where performed) may be performed in any order to tag the event message with (i.e. add to the event message) the relevant labels, identifiers and other information.

Following completion of steps 272-282 (where performed), the method passes back to step 290 of method 200, at which the tagged event message is transmitted to the event log archive 140.

Figure 3:
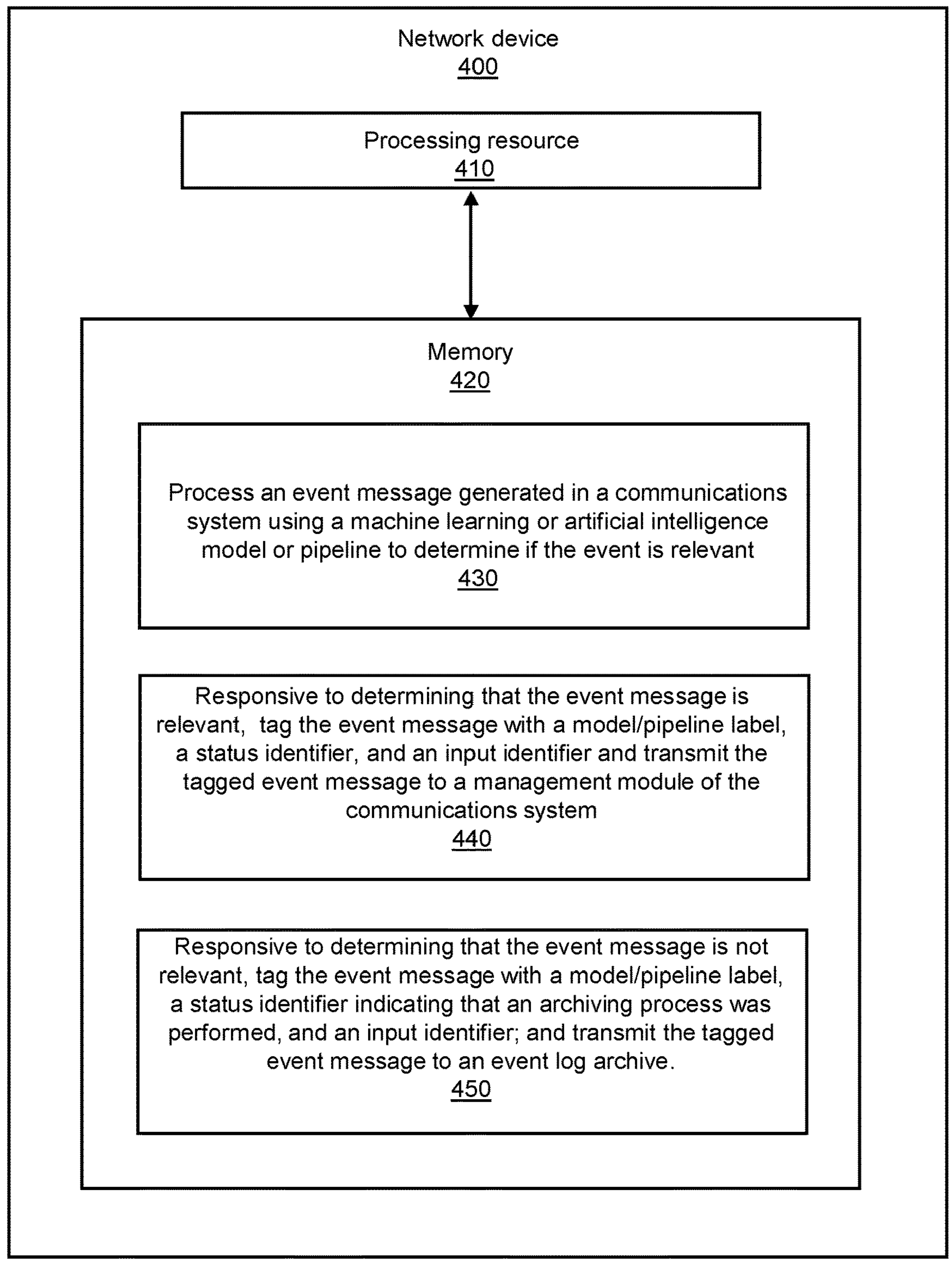
FIG. 3 is a block diagram illustrating an example network device.

FIG. 3 is a schematic representation of a network device 400 for use in the communications system 100 to process event messages generated by the network elements of the network environment 110. The network device 400 may be, for example, a pre-processing module 120 of the kind described above.

The network device 400 comprises a processing resource 410 coupled to a memory 420 which stores instructions which, when executed by the processing resource 410, cause the network device 400 to perform pre-processing of event messages received from the network elements of the network environment 110.

The instructions include instructions 430 to process an event message generated in a communications system using a machine learning or artificial intelligence model to determine if the event is relevant to the management module 130. The instructions further include instructions 440 to, responsive to determining that the event message is relevant, tag the event message with a model or pipeline label (e.g. a model or pipeline label retrieved from the model library 150) identifying the machine learning or artificial intelligence model or pipeline, a status identifier indicating a status of the event message following a process or set of processes performed by the model or pipeline, and an input identifier for identifying features or variables of the event message that were used as inputs to the model or pipeline, and to transmit the tagged event message to a management module of the communications system, as described above.

The instructions further include instructions 450 to, responsive to determining that the event message is not relevant, tag the event message with a model or pipeline label (e.g. a model or pipeline label retrieved from the model library 150) identifying the machine learning or artificial intelligence model or pipeline, a status identifier indicating that the event message is archived following an archiving process performed by the model or pipeline, and an input identifier for identifying features or variables of the event message that were used as inputs to the model or pipeline, and to transmit the tagged event message to an event log archive, again as described above.

Figure 4A:
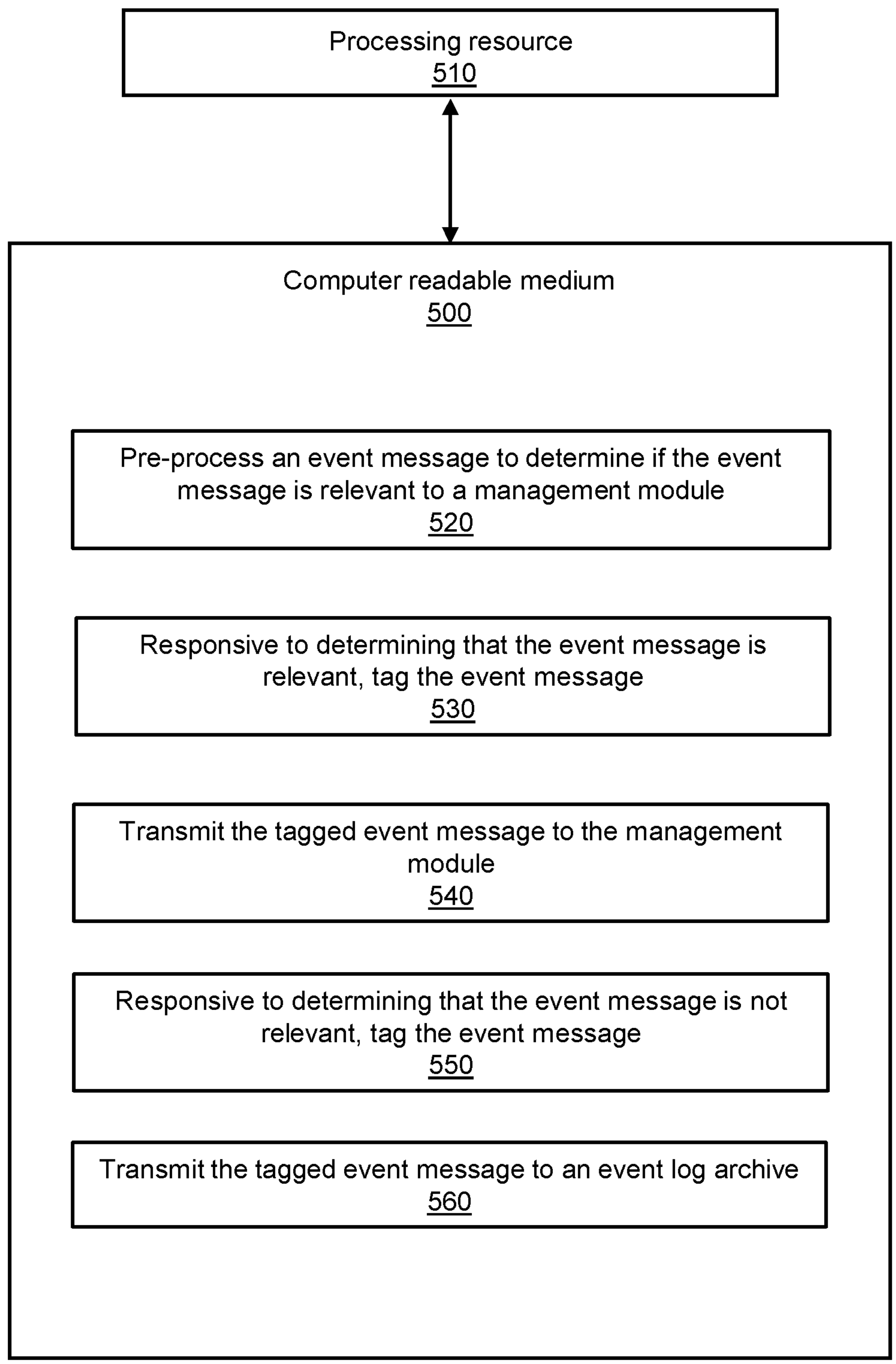
FIG. 4*a* is a block diagram illustrating an example computer readable medium storing instructions for handing an event message.

FIG. 4*a* is a block diagram illustrating a computer readable medium 500 storing instructions which, when executed by a processing resource 510, process event messages generated by the network elements of the network environment 110.

The instructions include instructions 520 to pre-process an event message, e.g. using an AI or ML model or pipeline, to determine if the event message is relevant to the management module 130 as described above. The instructions further include instructions 530 to, responsive to determining that the event message is relevant, tag the event message, as will be describe further below with reference to FIG. 4*b*. The instructions further include instructions 540 to transmit the tagged event message to the management module 130, e.g. as described above with reference to step 260 of FIG. 2*a*.

The instructions further include instructions 550 to, responsive to determining that the event message is not relevant, tag the event message, as will be described further below with reference to FIG. 4*c*. The instructions further include instructions 540 to transmit the tagged event message to the event log archive 140, e.g. as described above with reference to step 280 of FIG. 2*a*.

Figure 4B:
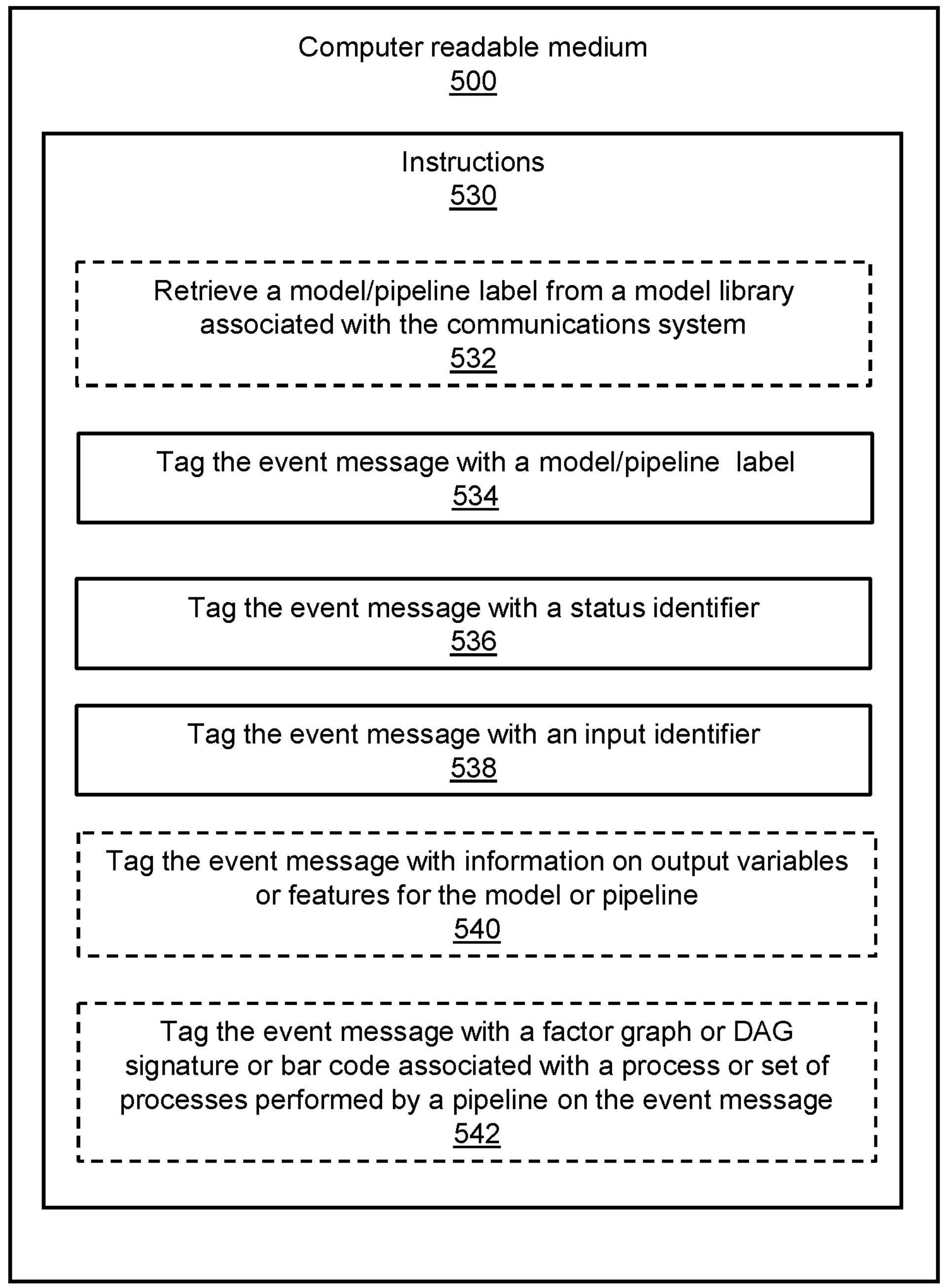
FIG. 4*b* is a block diagram illustrating further instructions stored in the computer readable medium of FIG. 4*a* for tagging an event message that has been determined to be relevant.

FIG. 4*b* is a block diagram illustrating further instructions stored in the computer readable medium 500 which, when executed by the processing resource 510, tag an event message that has been determined to be relevant to the management module 130. The further instructions may be included in the instructions 530, for example.

The further instructions may include instructions 532 to retrieve, from the model library 150, a model or pipeline label which identifies the model or pipeline of models (as appropriate) applied to the event message by instructions 520.

The further instructions include instructions 534 to tag the event message with a model or pipeline label identifying the model or pipeline used to process the event message. This model or pipeline label may be retrieved from the model library following execution of instructions 532, or may be obtained from elsewhere, e.g. from local storage associated with the processing resource 510.

The further instructions include instructions 536 to tag the event message with a status identifier indicating a status of the event message following a process (e.g. a screening process, a generating process) performed during pre-processing of the event message.

The further instructions include instructions 538 to tag the event message with an input identifier for identifying features or variables of the event message that were used as inputs to the model or pipeline. As described above, the input identifier may comprise a pointer which points to a record in a separate feature table containing features or events of the event message.

The further instructions may include instructions 540 to tag the event message with information on output variables for the model or pipeline that was applied to the event message during pre-processing.

The further instructions may include instructions 542 to tag the event message with a factor graph or DAG signature or bar code associated with a process or set of processes performed on the event message during pre-processing by a pipeline.

Figure 4C:
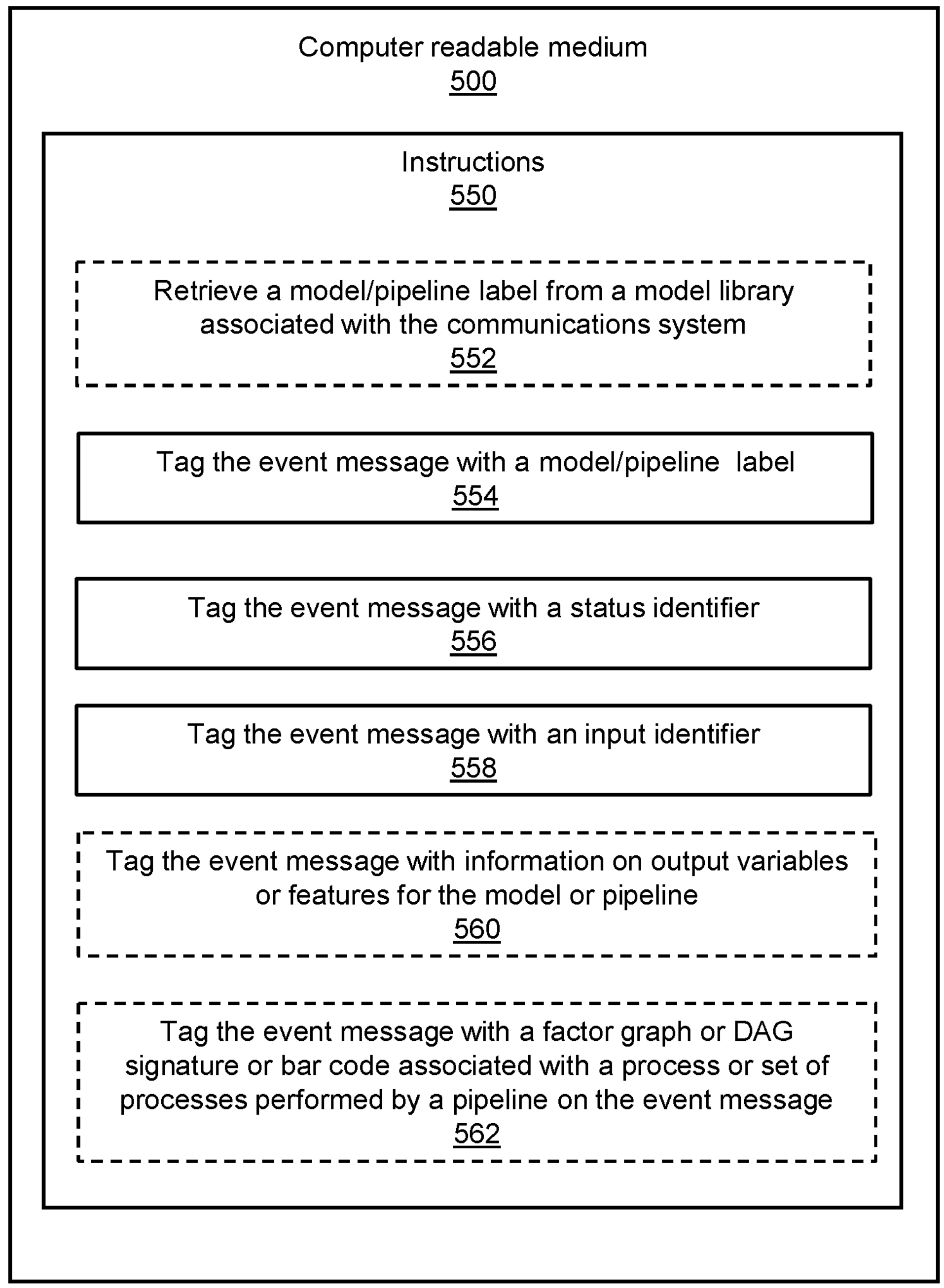
FIG. 4*c* is a block diagram illustrating further instructions stored in the computer readable medium of FIG. 4*a* for tagging an event message that has been determined not to be relevant.

FIG. 4*c* is a block diagram illustrating further instructions stored in the computer readable medium 500 which, when executed by the processing resource 510, tag an event message that has been determined not to be relevant to the management module 130. The further instructions may be included in the instructions 550, for example.

The further instructions may include instructions 552 to retrieve, from the model library 150, a model or pipeline label which identifies the model or pipeline of models (as appropriate) applied to the event message by instructions 520.

The further instructions include instructions 554 to tag the event message with a model or pipeline label identifying the model or pipeline used to process the event message. This model or pipeline label may be retrieved from the model library following execution of instructions 552, or may be obtained from elsewhere, e.g. from local storage associated with the processing resource 510.

The further instructions include instructions 556 to tag the event message with a status identifier indicating a status of the event message following a process (e.g. a screening process, a generating process) performed during pre-processing of the event message.

The further instructions include instructions 558 to tag the event message with an input identifier for identifying features or variables of the event message that were used as inputs to the model or pipeline. As described above, the input identifier may comprise a pointer which points to a record in a separate feature table containing features or events of the event message.

The further instructions may include instructions 560 to tag the event message with information on output variables for the model or pipeline that was applied to the event message during pre-processing.

The further instructions may include instructions 562 to tag the event message with a factor graph or DAG signature or bar code associated with a process or set of processes performed on the event message during pre-processing by a pipeline.

Figure 4D:
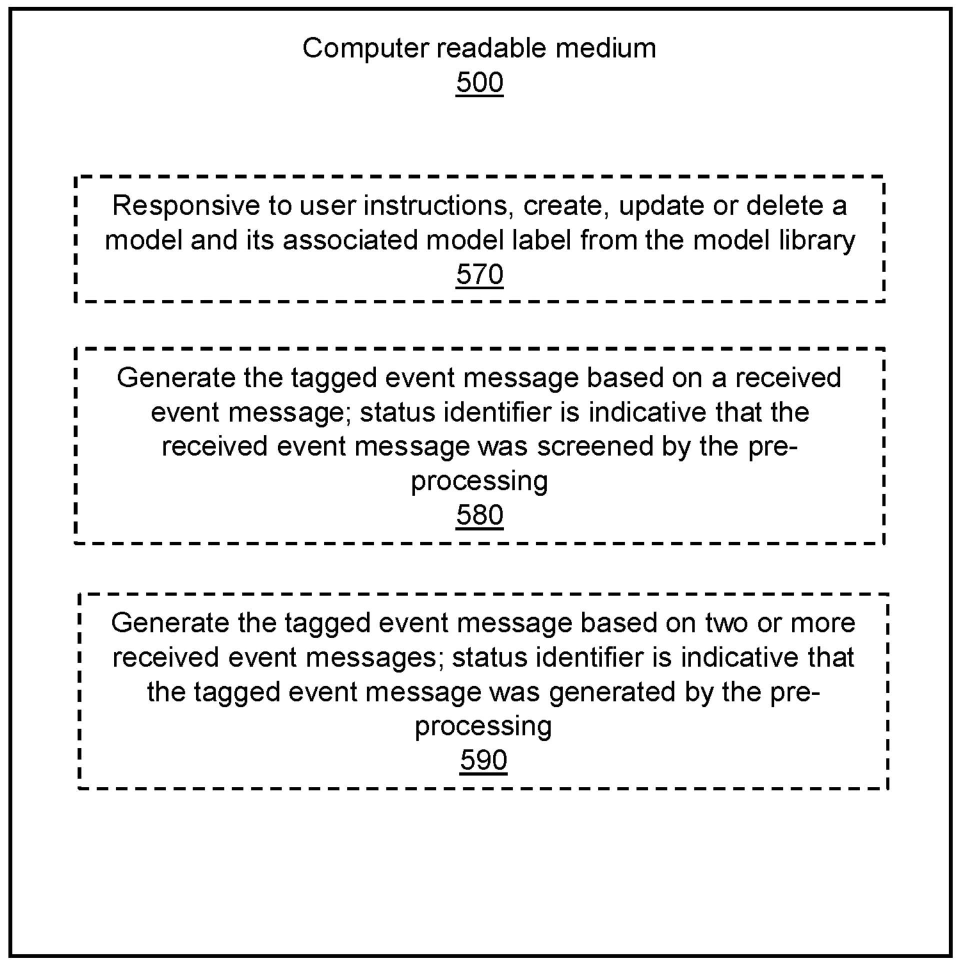
FIG. 4*d* is a block diagram illustrating additional instructions that may be stored in the computer readable medium 500 of FIG. 4*a* for providing additional functionality.

FIG. 4*d* is a block diagram illustrating additional instructions that may be stored in the computer readable medium 500 of FIG. 4*a* for providing additional functionality. The additional instructions may include instructions 570 to, responsive to user instructions, create, update or delete a model or pipeline and its associated model or pipeline label from the model library 150.

The additional instructions may further include instructions 580 to generate the tagged event message based on a single received event message. When these instructions are executed by the processing resource 510, the status identifier that is added to the event message may be indicative that the received event message was screened by the pre-processing. The additional instructions may further include instructions 590 to generate the tagged event message based on two or more received event messages. When these instructions are executed by the processing resource 510, the status identifier that is added to the event message may be indicative that the tagged event message was generated by the pre-processing.

The format of the event messages may vary depending, for example, on the network resource, application or service that has generated the event message. For example, event messages may be formatted in accordance with the ITU X.733 recommendation, or as SNMP (simple network messaging protocol) traps or Syslog event messages, or as messages formatted in accordance with the VES (virtual network function event stream) protocol. These are just some examples of possible formats for the event messages. As will be appreciated, there are numerous other event message formats and protocols that could be applied, and the present disclosure is not limited to any particular event message format or protocol.

If the event messages received by the pre-processing module 120 are formatted as Syslog event messages, the pre-processing module 120 may tag the event message by including the model or pipeline label and the associated model, DAG or factor graph, the process identifier, the input identifier, the information on output features or variables for the model or pipeline (where provided) and the status indicator (where provided) in the initial bytes of the Message Text attribute of the event message.

If the event messages received by the pre-processing module 120 received by the pre-processing module 120 are formatted as SNMP traps, a new management information base (MIB) may be defined in the system 100, containing object identifiers (OIDs) identifying variables for the model or pipeline label and the associated model, DAG or factor graph, the process identifier, the input identifier, the information on output features or variables for the model or pipeline (where provided) and the status indicator (where provided). The pre-processing module 120 may tag the event message by setting these variables in the SNMP trap.

As will be appreciated, numerous other event types, formats and protocols exist and may be used for event messages, and these event types, formats and protocols may be modified or customised by equipment vendors for use in their products. Thus, enriching event messages with tags in the manner described above may be more complex than simply adding the additional information described above to a received event message.

Figure 5:
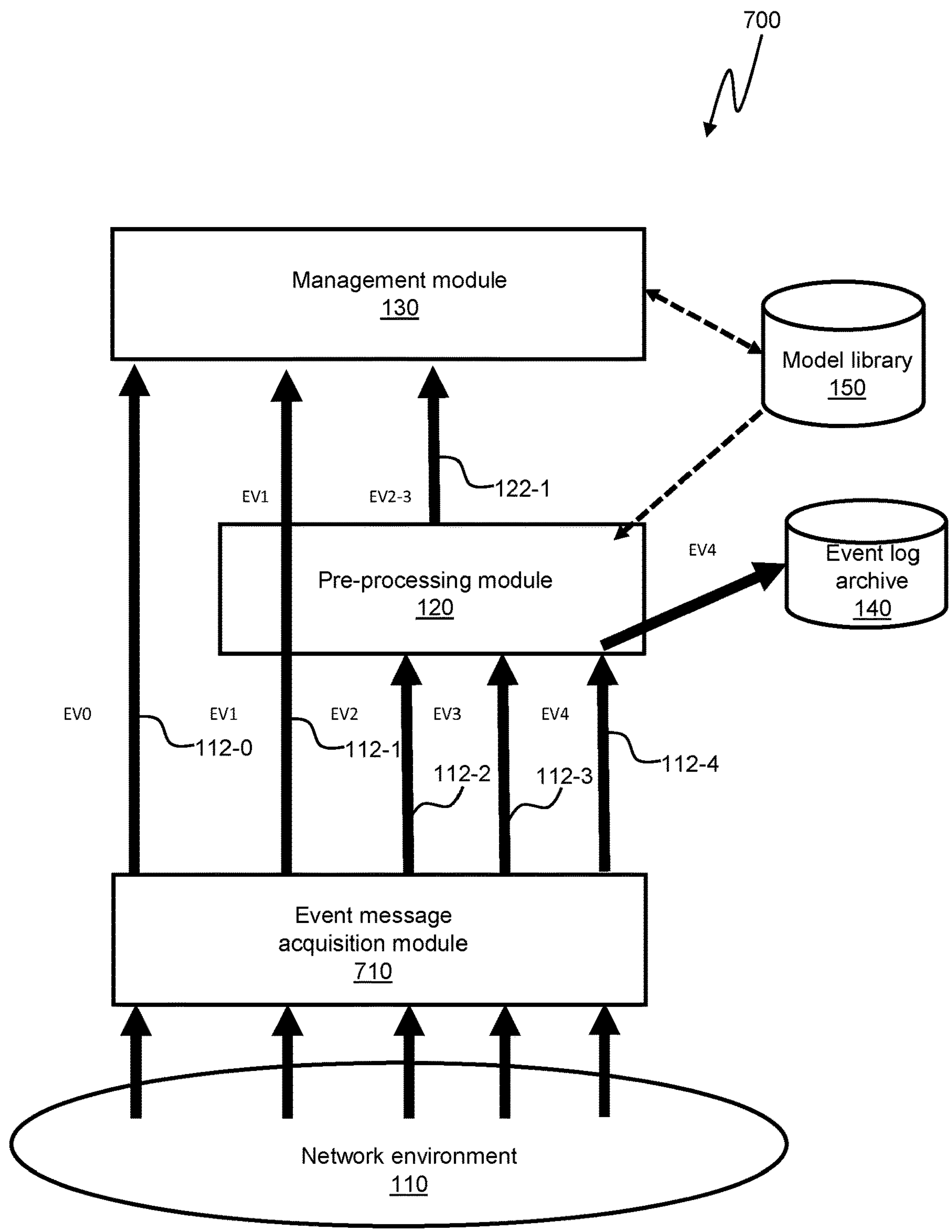
FIG. 5 is a schematic representation of another example communications management system.

FIG. 5 is a schematic representation of an alternative communications system 700. The communication system 700 is based on the communications system 100 of FIG. 1, and thus elements that are common to the communications systems 100, 700 are denoted by common reference numerals. Such common elements will not be described again in detail here, for the sake of clarity and brevity.

The communications system 700 differs from the communications system 100 in that it includes an event message acquisition module 710, logically disposed between the network environment 110 and the pre-processing module 120. The event message acquisition module 710 is configured to receive event messages from the network elements of the network environment 110, which may be in a variety of different formats, and to convert or translate the received event messages to a single event message format, before transmitting the converted or translated event messages to the pre-processing module 120, where they are pre-processed as described above.

The event message acquisition module 710 may be provided as a standalone physical network device or entity, or may be incorporated into the pre-processing module 120. The event message acquisition module 710 may be implemented as hardware, e.g. a suitably configured application specific integrated circuit (ASIC), field-programmable gate array (FPGA), memristor based Ternary Content Addressable Memory (TCAM), or the like, or alternatively may be implemented using a combination of hardware and software (e.g. as a set of computer program instructions stored in a memory which, when executed by a suitable processing resource, cause the processing resource to execute the instructions).

The event message acquisition module 710 may be configured to receive event messages from the network elements of the network environment 110 in a variety of different formats, to normalise the received event messages and map them to a single event message format, such as ITU X.733. Additional fields for the model or pipeline label and the associated model, DAG or factor graph, the process identifier, the input identifier, the information on output features or variables for the model, and the status indicator may be added to the normalised and mapped event messages by the event message acquisition module 710, before the modified event messages are transmitted to the pre-processing module 120, which tags the event messages by populating the additional fields as appropriate. Alternatively, the additional fields may be added to the event messages and populated by the pre-processing module 120 after receiving the normalised and mapped event messages from the event message acquisition module 710.

It will be appreciated from the foregoing that the present disclosure provides a mechanism for enriching event messages with additional information that is relevant for tracing the processing steps that have been applied to the event messages prior to being received by a management module, and thus how the event messages that are received by the management module were generated. This additional information facilitates identification of faults and security breaches, prediction of outages and identification of new events that may have been introduced through a software revision can be identified, and also provides a level of transparency about AI and ML models that may have been applied to the event messages.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality. Any reference signs in the claims shall not be construed so as to limit their scope.

The invention claimed is:

1. A method for handling event messages in a communications system, the method comprising:

receiving a first event message;

processing the first event message using a pre-processing module of the communications system to determine if the event message is relevant for a management module of the communications system; and determining that the first event message is relevant;

responsive to determining that the first event message is relevant, tagging the first event message to generate a tagged first event message;

transmitting the tagged first event message to the management module, wherein tagging the first event message comprises adding, to the first event message:

a first model or pipeline label identifying a first model or pipeline applied to the first event message by the pre-processing module;

a status identifier indicating a first status of the first event message following a process or set of processes performed by the first model or pipeline; and a first input identifier for identifying features or variables of the first event message that were used as inputs to the first model or pipeline;

receiving a second event message;

processing the second event message using the pre-processing module to determine if the event message is relevant for the management module;

determining that the second event message is not relevant;

responsive to determining that the second event message is not relevant, tagging the second event message to generate a tagged second event message; and transmitting the tagged second event message to the management module.

2. The method of claim 1, wherein the first input identifier points to a record in a separate table of events or features of the event message.

3. The method of claim 1, wherein tagging the second event message comprises adding, to the second event message:

a second model or pipeline label identifying a model or pipeline applied to the second event message by the pre-processing module;

a second status identifier indicating that the second event message is archived following an archiving process performed by the model or pipeline; and a second input identifier for identifying features or variables of the second event message that were used as inputs to the model or pipeline.

4. The method of claim 1, wherein the one or more models comprise an artificial intelligence model or a machine learning model.

5. The method of claim 1, wherein tagging the first event message further comprises adding, to the event message, information on output features or variables for the model or pipeline applied to the event message by the pre-processing module.

6. The method of claim 1, wherein adding the first model label comprises retrieving the first model label from a model library associated with the communications system, the model library containing models and/or pipelines and associated model labels.

7. The method of claim 1, wherein tagging the first event message further comprises adding, to the first event message, a factor graph or distributed acyclic graph (DAG) signature or bar code identifying a factor graph or DAG associated with the process or set of processes performed by the pipeline.

8. A non-transitory computer readable medium storing instructions which, when executed by a processing resource, cause the processing resource to:

pre-process an event message generated in a communications system to determine if the event message is relevant for a management module of the communications system;

responsive to determining that the event message is relevant:

tag the event message with:

a model or pipeline label identifying a model or pipeline applied to the event message during pre-processing of the event message;

a status identifier indicating a status of the event message following a process or set of processes performed by the model or pipeline; and an input identifier for identifying features or variables of the event message that were used as inputs to the model or pipeline; and responsive to determining that the event message is not relevant:

tag the event message with:

a model or pipeline label identifying a model or pipeline applied to the event message during pre-processing of the event message;

a status identifier indicating that the event message is archived following an archiving process performed by the model or pipeline; and an input identifier for identifying features or variables of the event message that were used as inputs to the model or pipeline; and transmit the tagged event message to an event log archive.

9. The non-transitory computer readable medium of claim 8, wherein the input identifier points to a record in a separate table of events or features of the event message.

10. The non-transitory computer readable medium of claim 8, wherein the one or more models comprise an artificial intelligence model or a machine learning model.

11. The non-transitory computer readable medium of claim 8, wherein the instructions, when executed by the processing resource, further cause the processing resource to tag the event message with information on output variables or features for the model or pipeline applied to the event message in the pre-processing.

12. The non-transitory computer readable medium of claim 8, wherein the instructions, when executed by the processing resource, further cause the processing resource to retrieve the model label from a model library associated with the communications system, the model library containing models and associated model labels.

13. The non-transitory computer readable medium of claim 11, wherein the instructions, when executed by the processing resource, further cause the processing resource to, responsive to user instructions, create, update or delete a model and its associated model label from the model library.

14. The non-transitory computer readable medium of claim 8, wherein the instructions, when executed by the processing resource, cause the processing resource to:

generate the tagged event message based on a received event message, and to tag the event message indicative the received event message was screened by the pre-processing; or, generate the tagged event message based on two or more received event messages, and to tag the event message indicative the received event message was generated by the pre-processing.

15. A network device comprising:

one or more processing resources; and memory storing instructions which, when executed by the one or more processing resources, cause the network device to:

process a first event message and a second event message generated in a communications system using a machine learning or artificial intelligence model or pipeline to determine, if the first event message and second event message are relevant;

determine that the first event message is relevant:

response to determining that the first event message is relevant, tag the first event message with:

a first model or pipeline label identifying the machine learning or artificial intelligence model or pipeline;

a first status identifier indicating a status of the event message following a process or set of processes performed by the machine learning or artificial intelligence model or pipeline; and a first input identifier for identifying features or variables of the event message that were used as inputs to the machine learning or artificial intelligence model or pipeline;

transmit the tagged event message to a management module of the communications system;

determine that the second event message is not relevant;

responsive to determining that the second event message is not relevant, tag the second event message to generate a tagged second event message; and transmit the tagged second event message to the management module.

16. The network device of claim 15, wherein the first input identifier points to a record in a separate table of events or features of the first event message.

17. The network device of claim 15, wherein the second event message is tagged with:

a second model or pipeline label identifying the machine learning or artificial intelligence model or pipeline;

a second status identifier indicating that the second event message is archived following an archiving process performed by the machine learning or artificial intelligence model or pipeline; and a second input identifier for identifying features or variables of the second event message that were used as inputs to the machine learning or artificial intelligence model or pipeline.

18. The network device of claim 15, wherein the instructions, when executed by the one or more processing resources, further cause the network device to tag the first event message with information on output variables or features for the machine learning or artificial intelligence model or pipeline.

19. The network device of claim 15, wherein the instructions, when executed by the one or more processing resources, further cause the network device to retrieve the first model label from a model library associated with the communications system, the model library containing models and associated model labels.

20. The network device of claim 15, wherein transmitting the first tagged event message to the management module includes combining the content of two or more event messages received by the network device.

* * * * *